T. E. MURRAY.
DEVICE FOR ATTACHING THE ENDS OF WIRE WHEEL SPOKES TO METAL RIMS.
APPLICATION FILED MAY 9, 1918.

1,286,065.

Patented Nov. 26, 1918.

Inventor
Thomas E. Murray
By his Attorney

UNITED STATES PATENT OFFICE.

THOMAS E. MURRAY, OF NEW YORK, N. Y.

DEVICE FOR ATTACHING THE ENDS OF WIRE WHEEL-SPOKES TO METAL RIMS.

1,286,065.   Specification of Letters Patent.   Patented Nov. 26, 1918.

Application filed May 9, 1918. Serial No. 233,455.

*To all whom it may concern:*

Be it known that I, THOMAS E. MURRAY, a citizen of the United States, residing at New York, in the county of New York and State of New York, have invented a certain new and useful Improvement in Devices for Attaching the Ends of Wire Wheel-Spokes to Metal Rims, of which the following is a specification.

The invention is a device for attaching the end of a wire wheel spoke to a metal rim. The object is to simplify and cheapen the construction.

In the accompanying drawings—

Figure 1:
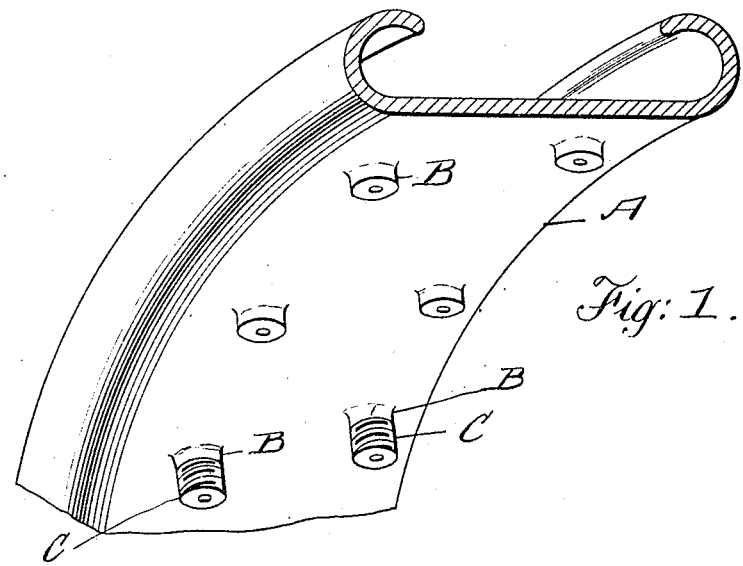
Figure 2:
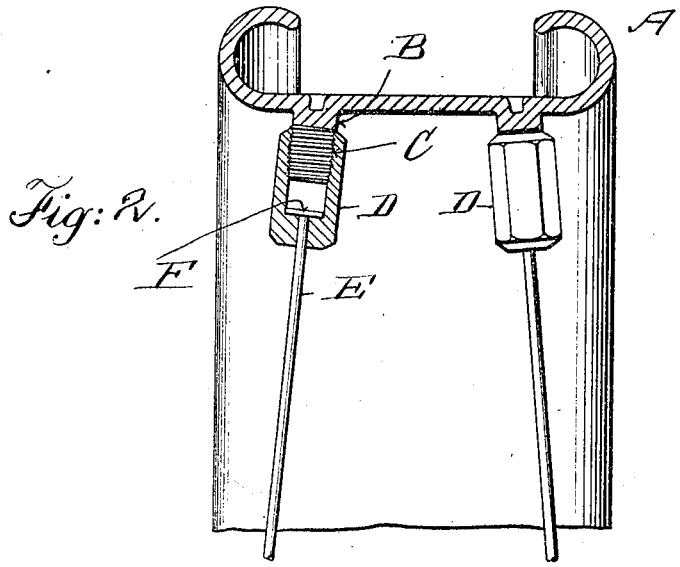

Figure 1 is a perspective view of a portion of a wheel rim, showing the projections on the under side thereof, and on two of said projections the threaded studs welded thereto. Fig. 2 is a cross section of the rim and projections thereon, showing the studs in position, and the nuts on the spoke ends engaging said studs.

Similar letters of reference indicate like parts.

A is a metal wheel rim of the usual type. On the under side of the rim are projections B, preferably struck up from the metal of said rim. On each of said projections is electrically welded a threaded stud C.

Nuts D, rotatably connected to the wire spokes E, engage the threaded studs C and secure the spokes thereto. Said nuts may be cup-shaped, as shown, and provided at their ends with openings through which the spokes pass—said spokes being retained in the nuts by heads F on their ends. When the nuts are set up, the spokes are drawn tight between the rim and the hub, (not shown), to which they are connected.

I claim:

1. In combination with a metal wheel rim and a wire spoke, a projection on the under side of said rim, a threaded stud electrically welded to said projection, and a nut engaging said projection and rotatably connected to the end of said spoke.

2. In combination with a metal wheel rim and a wire spoke, a projection on the under side of said rim formed by striking up the metal thereof, a threaded stud electrically welded to said projection, and an internally threaded cup-shaped nut engaging said projection and rotatably connected to the end of said spoke.

In testimony whereof I have affixed my signature in presence of two witnesses.

THOMAS E. MURRAY.

Witnesses:
  GERTRUDE T. PORTER,
  MAY T. McGARRY.